(12) United States Patent
Mahajan et al.

(10) Patent No.: US 9,430,313 B2
(45) Date of Patent: Aug. 30, 2016

(54) GENERATION OF DEBUGGING LOG LIST IN A BLADE SERVER ENVIRONMENT

(71) Applicant: International Business Machines Corporation, Armonk, NY (US)

(72) Inventors: Ajay Kumar Mahajan, Austin, TX (US); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 14/023,042

(22) Filed: Sep. 10, 2013

(65) Prior Publication Data

US 2015/0074471 A1    Mar. 12, 2015

(51) Int. Cl.
*G06F 11/07*    (2006.01)

(52) U.S. Cl.
CPC ....... *G06F 11/0787* (2013.01); *G06F 11/0709* (2013.01)

(58) Field of Classification Search
CPC .............. G06F 1/00; G06F 1/04; G06F 1/12; G06F 1/26; G06F 1/32; G06F 11/30; G06F 15/16; G06F 11/0709; G06F 11/0787
See application file for complete search history.

(56) References Cited

U.S. PATENT DOCUMENTS

| | | | |
|---|---|---|---|
| 8,032,790 B2 | 10/2011 | Chopra et al. | |
| 8,365,176 B2 | 1/2013 | Campbell et al. | |
| 8,826,060 B2 * | 9/2014 | Bozak | H04L 43/106 713/502 |
| 2004/0230873 A1 * | 11/2004 | Ward | H04L 41/12 714/39 |
| 2006/0195731 A1 | 8/2006 | Patterson et al. | |
| 2007/0168696 A1 * | 7/2007 | Ridel | G06F 11/3495 714/4.1 |
| 2011/0271152 A1 | 11/2011 | Hattori et al. | |
| 2012/0246517 A1 | 9/2012 | Bender et al. | |
| 2012/0311126 A1 * | 12/2012 | Jadallah | H04L 41/5067 709/224 |
| 2014/0025770 A1 * | 1/2014 | Warfield | G06F 15/17331 709/213 |
| 2014/0105262 A1 * | 4/2014 | Alloin | H04B 3/46 375/222 |

FOREIGN PATENT DOCUMENTS

CN        102955737 A      3/2013

* cited by examiner

*Primary Examiner* — Chun Cao
*Assistant Examiner* — Mohammad A Rahman
(74) *Attorney, Agent, or Firm* — George R. McGuire; Bond Schoeneck & King, PLLC; John Pivnichny

(57) ABSTRACT

Methods, non-transitory storage medium, and systems for generating an aggregated list of problem conditions associated with blade servers to facilitate efficient debugging thereof. In a blade server environment, each chassis is equipped with a chassis management module and each blade in each chassis is associated with a blade management controller. A data map representing the relationships between the blade servers and the shared resources is utilized by a chassis management module to aggregate and link problem conditions sensed by any of the blade management controllers.

11 Claims, 4 Drawing Sheets

| ITE | FAN | TOR | High Speed Interconnect | Operator Panel |
|---|---|---|---|---|
| ITE1 | FAN1 | Port Nr | | |
| ITE2 | FAN2 | Port Nr | | |
| ITE3 | FAN1 | Port Nr | | |
| ITE4 | FAN2 | Port Nr | | |

50

CMM MAP

GENERATION OF DEBUGGING LOG LIST IN A BLADE SERVER ENVIRONMENT

BACKGROUND

The present invention relates generally to server computers, and more particularly to error control mechanisms used in blade server environments.

Blade servers are modularized, dedicated servers configured on a board that include the necessary technology to perform the dedicated function of the particular server, but do not include many of the necessary functional features of a standalone server, such as a cooling fan, power supply, and the like. This minimized structure decreases the amount of space needed for the blade server, thus permitting many blade servers to be installed within a single chassis. A consequence and benefit of this minimalist space approach achieved through blade servers is greater processing functionality achieved in a given amount of rack space.

A blade enclosure or chassis can house several blade servers therein, and includes the shared services for the blades such as cooling, networking, power, interconnects, and the like that are otherwise not present in the individual blade servers. By locating these services in one place and sharing them amongst a group of blade computers, the space efficiency and utilization is enhanced.

While numerous blade servers can share certain resources, an error occurring on one blade server can impact other blade servers. Due to the number of blade servers operating within a particular computing environment, debugging an error condition can be time consuming and require many blade servers to be unnecessarily taken off-line while the error is fixed.

Thus, there is a need in the art to more efficiently debug errors occurring in a blade server environment.

It is a principal object and advantage of the present invention to provide a method, product, and system for streamlining the debugging process in a blade server computing environment.

It is another object and advantage of the present invention to provide a method, product, and system that enhances the efficiency of a blade server computing environment.

Other objects and advantages of the present invention will in part be obvious and in part appear hereinafter.

SUMMARY

In accordance with the foregoing objects and advantages, the present invention is directed towards inventive methods, systems, and apparatus for capturing data associated with an error occurring on one blade server in a blade server environment having many blade servers. For example, a method, system, and apparatus to request, generate, and integrate debug information from heterogeneous out-of-band controllers and associate it with any error log generated when a problem is detected from the common shared resources in a blade chassis is provided.

Generally, in one aspect, the present invention provides a method, system, and apparatus for associating a debug error with an error log in a computing environment that has a plurality of blade servers that are housed in a blade chassis and that share a plurality of resources. The method, system and apparatus comprising the steps of or include a computer program programmed to provide a chassis management module that maintains a map identifying the relationships between the plurality of blade servers and the shared chassis resources; provide a blade management controller for each of the plurality of blade servers; identify in the blade management controller a predetermined problem condition in a shared chassis resource sensed by the blade server associated with the blade management controller; institute communication of the predetermined problem condition from said blade management controller to said chassis management controller; determine in the chassis management module what other, if any, of the blade servers share the shared chassis resource associated with the predetermined problem condition; determine in the chassis management module if it controls the shared resource associated with the predetermined problem condition; and aggregating and linking the debug information for the problem condition from each of the blade management controllers.

In another aspect of the present invention, there is provided a system for associating a debug error with an error log in a computing environment having a plurality of blade servers that are housed in any one of a plurality of blade chassis and that share a plurality of resources. The system generally comprises a computer having data stored thereon that is representative of a map identifying the relationships between the plurality of blade servers and the shared chassis resources; a first chassis management module adapted to utilize the map; a blade management controller for each of the plurality of blade servers; and a non-transitory, computer-readable storage medium containing program code. The storage medium comprises program code for identifying in the blade management controller a predetermined problem condition in a shared chassis resource sensed by the blade server associated with the blade management controller; and program code for aggregating and linking the debug information for the problem condition from each of the blade management controllers.

In another aspect of the present invention, there is provided a non-transitory, computer-readable storage medium containing program code for use in a system comprising a computer having data stored thereon that is representative of a map identifying the relationships between the plurality of blade servers and the shared chassis resources; a first chassis management module adapted to utilize the map; a second chassis management module, and a blade management controller for each of the plurality of blade servers. The storage medium comprises: program code for instituting communication of the predetermined problem condition from the blade management controller to the first chassis management controller; and program code for determining in the first chassis management module what other, if any, of the blade servers share the shared chassis resource associated with the predetermined problem condition.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
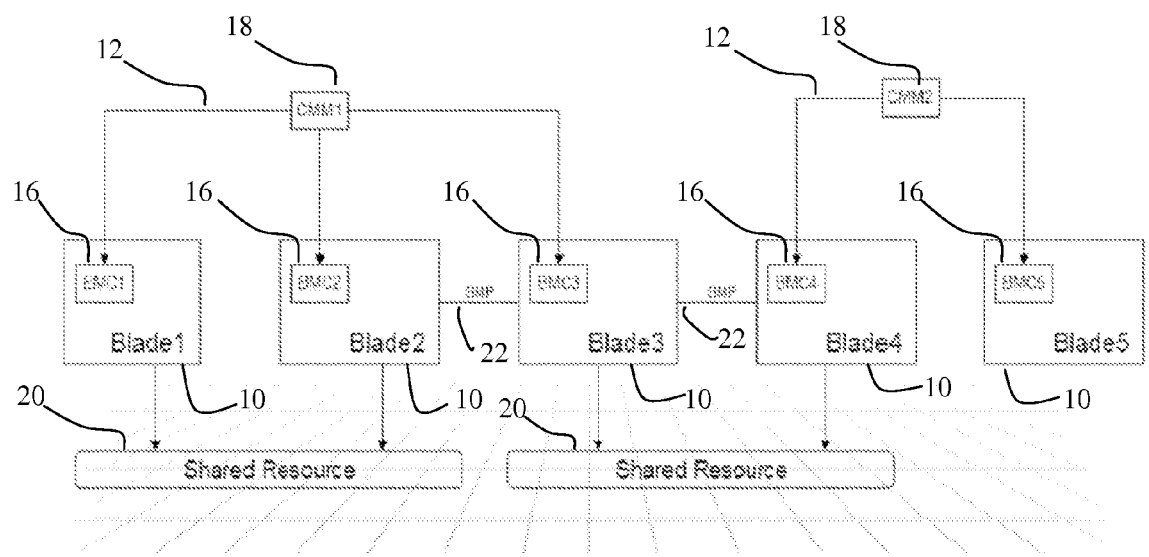
FIG. 1 is a block diagram of a blade server environment according to aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings figures, wherein like reference numerals refer to like parts throughout, there is seen in FIG. 1 a block diagram illustrative of a blade server environment. In a blade server environment, heterogeneous blade servers 10 can be placed in a single chassis, represented by arrows 12, and managed out-of-band by different board management controllers (BMCs) 16. For example, a System X blade managed by an Integrated Management Module and a System P blade managed by a Flexible Service Processor can be placed in adjacent slots in a chassis. While these out-of-band management modules do not interact with each other directly, the management information is aggregated and centrally controlled in each blade chassis by a chassis management module (CMM) 18. There are certain shared resources 20 in a chassis (such as, for example, a fan, high speed interconnects, top of the rack switches, etc.), that are controlled by the CMM 18 and are shared with these heterogeneous blade servers 10. In the environment illustrated in FIG. 1, certain of the blade servers 10 are arranged to operate in a synchronous multiprocessing (SMP) mode as illustrated by arrows 22, while others are not. It should be understood that this illustration is simply intending to diagrammatically show that use scenarios where resources 20 can be shared by blades 10 that are either in SMP mode or are not in SMP mode (and that, as will be described hereinafter, debug information can be generated from either architecture.)

In respect of the environment illustrated in FIG. 1, it would be useful to generate dump from the blade servers 10 when a problem appears in any one of the shared resources 20. In addition, when multiple blade servers 10 are placed in a different chassis 12, the blade servers are managed by different CMMs 18 (CMM 2 in FIG. 1, for example). Thus, a protocol to request the various CMMs involved in generating debug information from respective BMCs 16 would also be useful.

Figure 2:
FIG. 2 is a table illustrating a sample map in accordance with an aspect of the present invention.

With reference to FIG. 2, a table is shown that is a visual representation of a map 50 that each CMM 18 accesses in accordance with an aspect of the present invention. Map 50 organizes the common chassis wide resources against the blades/ITEs using the shared resources 20. In the example provided in FIG. 2, ITEs 1 and 3 each use FAN 1, while ITEs 2 and 4 use FAN 2. The map 50 helps facilitate the debugging process associated with the various aspects of the present invention. When a BMC 16 on one blade server 10 identifies a problem with a common resource, it communicates to its associated CMM 18 about the problem through a system event log or an OEM extension log error. The CMM 18, in turn, parses through map 50 and identifies which other blade servers 10 are sharing the common resource. It then communicates the problem to the BMC 16 on those blade servers 10 requesting to capture related debug information. If the failing resource (e.g., FAN 1) itself is under the control of the CMM 18, then the CMM itself generates the relevant debug information. Once all requested BMCs 16 report the debug information to the CMM 18, it gets aggregated and linked to the error reported by the first BMC 16 that reported the problem. For example, if one of the blade servers 10 is experiencing an increasing trend of temperature in one or more sensors in one of the zones, it reports the problem to CMM 18. The problem, for example, could be due to a faulty fan. CMM 18 then captures its logs related to the corresponding fan; it can also request debug information (e.g., temperature trends) from other blade servers 10 sharing the same fan (common resource). Once the debug information from all three parties (2 servers and 1 CMM in this example) are available, debugging the following is possible: (1) problems with sensors on the first server 10 reporting increasing temperature trend; (2) problems with the fan itself; or (3) problems related to the max RPM supported by the fan and its capability to cool down both servers. This scenario is further described below.

Figure 3:
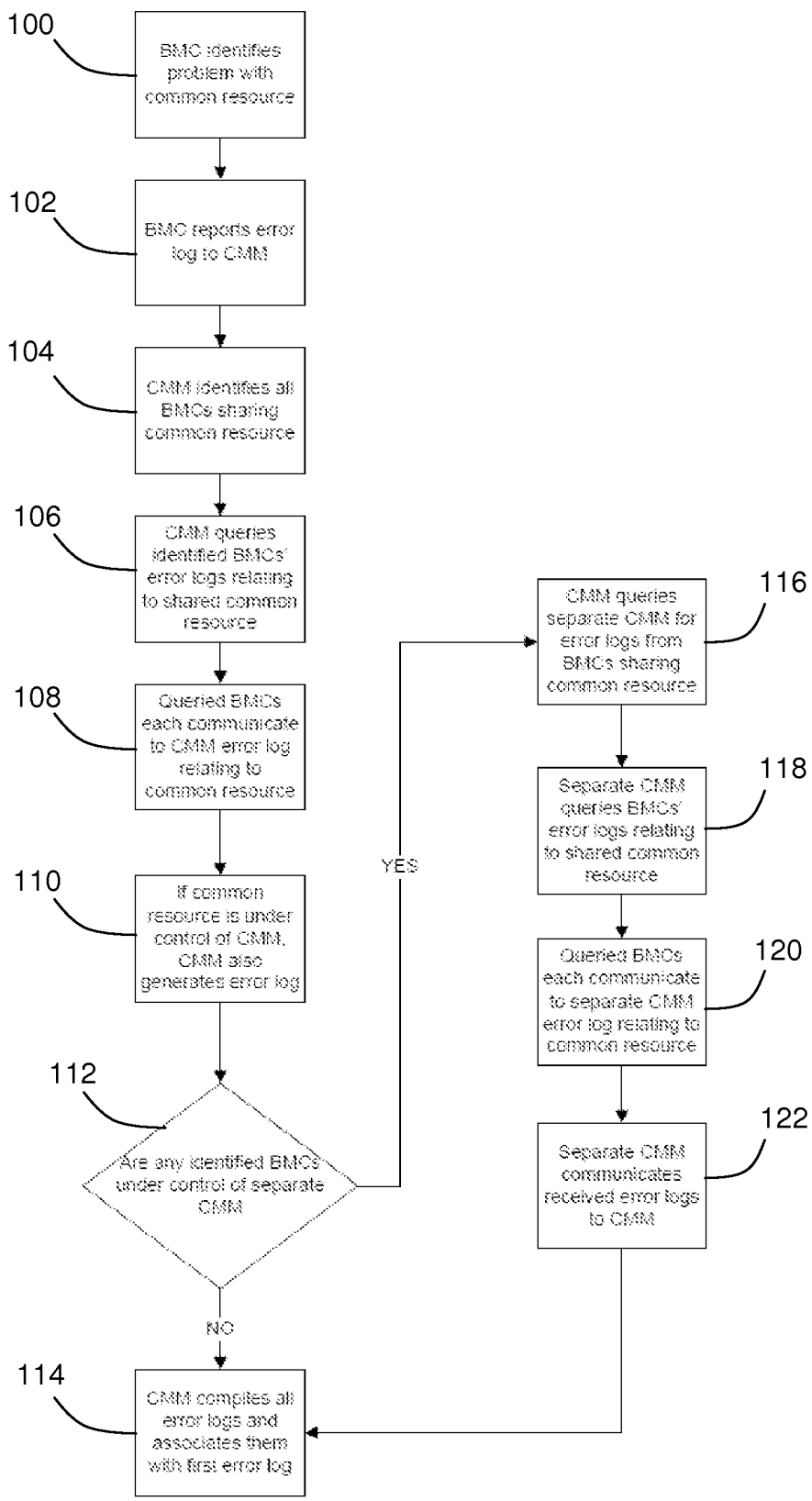
FIG. 3 is a flow chart illustrating an aspect of the present invention in regard to a blade server environment in which multiple blade servers share a common resource.
Figure 4:
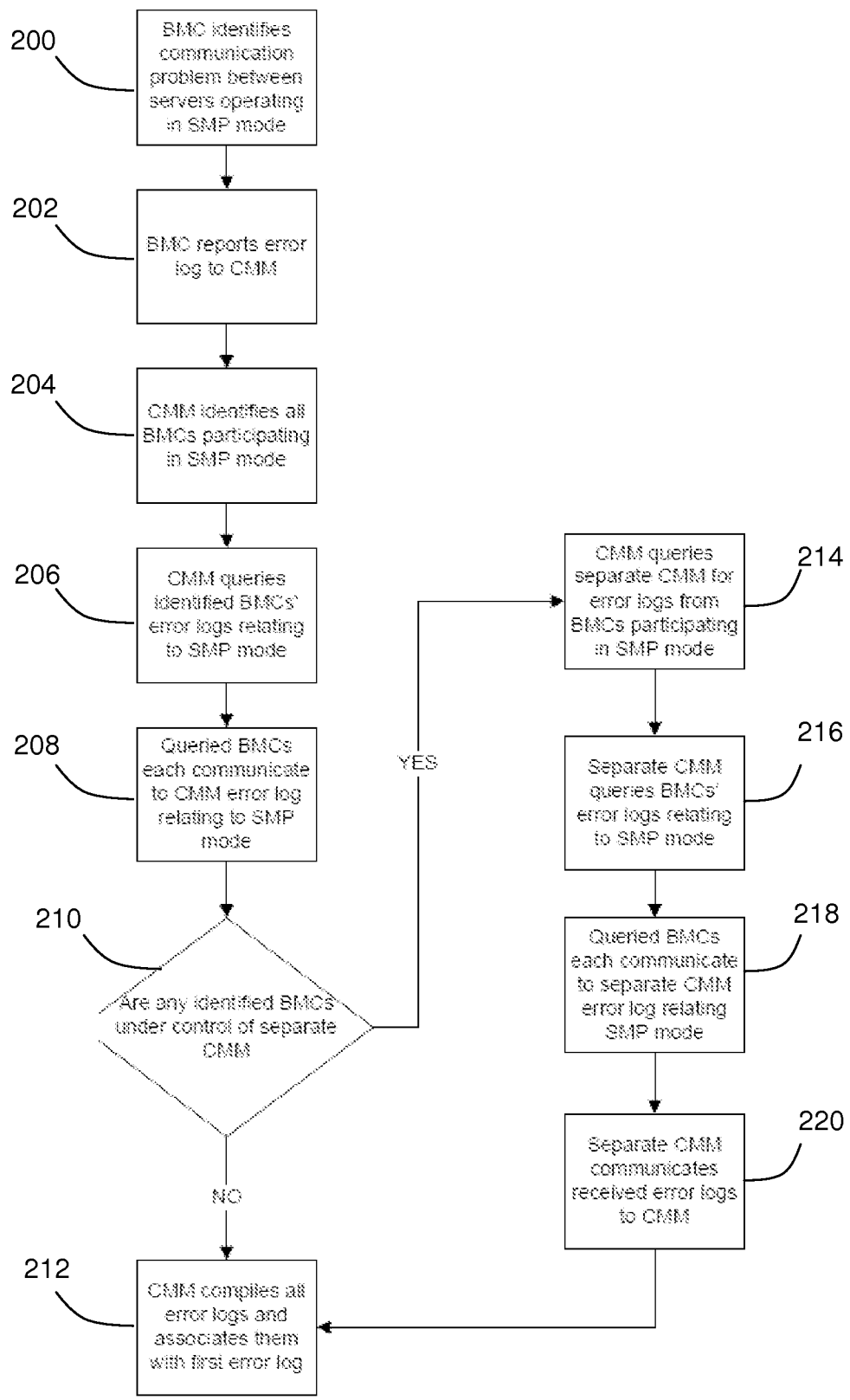
FIG. 4 is a flow chart illustrating an aspect of the present invention in regard to a blade server environment in which multiple blade servers operate in symmetric multiprocessing (SMP) mode.

In one aspect of the present invention, when a problem with a shared resource 20 is realized, all BMCs 16 are simultaneously alerted to the problem and trigger the debug information gathering process cooperatively. Thus, a computer program stored on a non-transitory, computer readable storage medium and run on a processor is provided and that performs the functions described hereinafter. With reference to FIG. 3, first a BMC 16 identifies a problem with a shared system resource 20 in step 100, and the BMC 16 transmits the error in a log to its associated CMM 18 in step 102. In step 104 the CMM 18 will parse map 50 and identify all BMCs 16 that share the common resource 20 to which a problem has been associated. Next, in step 106, the CMM 18 queries the identified BMCs' error logs relating to the shared common resource 20, and in step 108 each queried BMC 16 communicates to the CMM 18 the error log relating to the shared system resource 20. Next, if the common resource 20 is under the control of the CMM 18, then in step 110, the CMM also generates an error log. It is then determined in step 112 whether any identified BMCs 16 are under the control of a separate CMM 18 (e.g., CMM2). If not, the one CMM 18 simply compiles all the error logs and associates them with a first error log in step 114. If there are BMCs under the control of a separate CMM 18, then in step 116 the first CMM queries the separate CMMs for error logs from the BMCs sharing the common resource for which the problem has been detected. Next, the separate CMM 18 queries the BMCs' error logs relating to the shared common resource in step 118. Each queried BMC communicates to the separate CMM 18 error log relating to the common resource in step 120. In step 122, the separate CMM 18 then communicates the received error logs to the first CMM 18, which then compiles all the error logs and associates them with the first error log in step 114.

As illustrated in FIG. 3, another aspect of the present invention relates to compiling the error log information relating to communications issues occurring between blade servers 10 operating in SMP mode. In the first step 200, a BMC 16 identifies a communication problem between blade servers operating in SMP mode. In step 202, the BMC 16 reports the error log to its CMM 18. The CMM 18 then, in step 204, identifies all BMCs 16 participating in SMP mode, and then in step 206 queries the identified BMCs' error logs relating to SMP mode. The queried BMCs 16 each then communicate to the CMM 18 their error logs relating to SMP mode in step 208. In step 210 it is determined whether any identified BMCs 16 are under the control of a different/separate CMM 18. If not, then in step 212, the CMM 18 simply compiles all the error logs received from the BMCs 16 and associates them with the first error log. If there is any BMCs 16 under the control of a separate CMM 18, then in step 214 the first CMM 18 queries the separate CMM(s) 18 for error logs from BMCs 16 participating in SMP mode. In step 216, the separate CMM 18 actually queries the BMCs' error logs relating to SMP mode, and in step 218, the queried BMCs 16 each communicate the error logs relating to SMP mode back to the separate CMM 18. In step 220, the separate CMM 18 communicates the received error logs to the first CMM 18, and then in step 212, the first CMM 18 compiles all the error logs and associates them with the first error log.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present invention has been described in connection with a preferred embodiment, it should be understood that modifications, alterations, and additions can be made to the invention without departing from the scope of the invention as defined by the claims.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for associating a debug error with an error log in a computing environment having a plurality of blade servers that are housed in any one out of a plurality of blade chassis and that share a plurality of resources, comprising the steps of:
   a) providing a first chassis management module that utilizes a map identifying the relationships between the plurality of blade servers and the shared chassis resources;
   b) providing a blade management controller for each of the plurality of blade servers;
   c) identifying in said blade management controller a predetermined problem condition in a shared chassis resource sensed by a blade server associated with said blade management controller;
   d) instituting communication of the predetermined problem condition from said blade management controller to said first chassis management controller;
   e) determining in said first chassis management module what other, if any, of the blade servers under its control share the shared chassis resource associated with the predetermined problem condition;
   f) instituting a request for debug information from said first chassis management module to each of the other blade management controllers for each blade server that was determined to share the shared chassis resource associated with the predetermined problem condition;
   g) receiving, by the first chassis management module, the requested debug information from each of the other blade management controllers for each blade server that was determined to share the shared chassis resource associated with the predetermined problem condition; and
   h) aggregating and linking the received debug information for the problem condition from each of the blade management controllers.

2. The method according to claim 1, prior to step h) comprising the further step of determining in said first chassis management module if any blade servers identified as sharing the resource associated with the predetermined problem condition are under the control of a second chassis management module.

3. The method according to claim 2, comprising the further step of instituting communication between said first chassis management module and said second chassis management module that requests said second chassis management module to obtain error logs related to the predetermined problem condition from any blade servers under its control.

4. The method according to claim 3, comprising the further step of instituting communication between said second chassis management module and said first chassis management module for purposes of aggregating error logs related to the predetermined problem.

5. A system for associating a debug error with an error log in a computing environment having a plurality of blade servers that are housed in any one of a plurality of blade chassis and that share a plurality of resources, comprising:
   a) a computer having data stored thereon that is representative of a map identifying the relationships between the plurality of blade servers and the shared chassis resources;
   b) a first chassis management module adapted to utilize said map;
   c) a blade management controller for each of the plurality of blade servers; and
   d) a non-transitory, computer-readable storage medium containing program code, comprising:
      i) program code for identifying in said blade management controller a predetermined problem condition in a shared chassis resource sensed by the blade server associated with said blade management controller;
      ii) program code for communicating the predetermined problem condition from said blade management controller to the first chassis management controller;
      iii) program code for determining in said first chassis management module what other, if any, of the blade servers under its control share the shared chassis resource associated with the predetermined problem condition;
      iv) program code for requesting debug information from each of the other blade management controllers for each blade server that was determined to share the shared chassis resource associated with the predetermined problem condition; and
      v) program code for aggregating and linking the debug information for the problem condition from each of the blade management controllers.

6. The system according to claim 5, further comprising a second chassis management module.

7. The system according to claim 6, wherein said storage medium further comprises program code for instituting communication between said first chassis management module and said second chassis management module that requests said second chassis management module to obtain error logs related to the predetermined problem condition from any blade servers under its control.

8. The system according to claim 7, wherein said storage medium further comprises program code for instituting communication between said second chassis management module and said first chassis management module for purposes of aggregating error logs related to the predetermined problem.

9. A non-transitory, computer-readable storage medium containing program code for use in a system comprising a computer having data stored thereon that is representative of a map identifying the relationships between the plurality of blade servers and the shared chassis resources; a first chassis management module adapted to utilize said map; a second chassis management module, and a blade management controller for each of the plurality of blade servers, said storage medium comprising:
   i) program code for instituting communication of the predetermined problem condition from said blade management controller to said first chassis management controller;
   ii) program code for determining in said first chassis management module what other, if any, of the blade servers share the shared chassis resource associated with the predetermined problem condition;

iii) program code for requesting debug information from each of the other blade management controllers for each blade server that was determined to share the shared chassis resource associated with the predetermined problem condition; and iv) program code for aggregating and linking the debug information for the problem condition from each of the blade management controllers.

10. The storage medium according to claim 9, further comprising program code for instituting communication between said first chassis management module and said second chassis management module that requests said second chassis management module to obtain error logs related to the predetermined problem condition from any blade servers under its control.

11. The storage medium according to claim 10, further comprising program code for instituting communication between said second chassis management module and said first chassis management module for purposes of aggregating error logs related to the predetermined problem.

* * * * *